United States Patent [19]
Hughes

[11] Patent Number: 5,626,196
[45] Date of Patent: May 6, 1997

[54] SEED DRILL WITH SCRAPER/SOIL FIRMING ATTACHMENT

[75] Inventor: Jeffrey S. Hughes, Glen Elder, Kans.

[73] Assignee: Sunflower Manufacturing Co., Inc., Beloit, Kans.

[21] Appl. No.: 585,452

[22] Filed: Jan. 16, 1996

[51] Int. Cl.$^6$ .................................................. A01B 15/16
[52] U.S. Cl. ........................ 172/558; 172/556; 111/191
[58] Field of Search .......................... 111/189, 197, 111/164, 190, 191, 139, 140; 172/558–565, 556, 139–142; 403/3, 4, 22

[56] References Cited

U.S. PATENT DOCUMENTS

| | | |
|---|---|---|
| 404,108 | 5/1889 | Patric et al. ................ 111/197 X |
| 610,316 | 9/1898 | Arnett . |
| 712,564 | 11/1902 | Michael . |
| 1,410,883 | 3/1922 | Bozard . |
| 2,682,825 | 7/1954 | Warholoski ................ 172/558 |
| 3,175,622 | 3/1965 | Stam ................ 111/190 X |
| 3,536,145 | 10/1970 | Clark ................ 111/190 X |
| 4,141,302 | 2/1979 | Morrison, Jr. et al. ............ 111/924 X |
| 4,407,207 | 10/1983 | Dreyer . |
| 4,834,189 | 5/1989 | Peterson et al. ................ 172/166 |
| 4,998,488 | 3/1991 | Hansson ................ 172/558 X |
| 5,092,255 | 3/1992 | Long et al. ................ 111/197 X |
| 5,318,133 | 6/1994 | Logue . |
| 5,394,946 | 3/1995 | Clifton et al. ................ 172/139 |
| 5,398,625 | 3/1995 | Johnson et al. ................ 111/164 X |
| 5,507,351 | 4/1996 | Martin ................ 172/558 |

*Primary Examiner*—Terry Lee Melius
*Assistant Examiner*—Victor Batson
*Attorney, Agent, or Firm*—Litman, McMahon and Brown, L.L.C.

[57] ABSTRACT

A seed drill includes a conventional single or double disc blade soil opener for creating seed trenches for the deposition of seeds by a seeder. A scraper/soil firming assembly is attached to the outside of each disc blade axle. The scraper/soil firming assembly includes a bracket for mounting a scraper/soil firming blade and a locking plate for locking the mounting bracket and blade at a selected angle relative to the disc blade axle. The scraper/soil firming blade is a flat bar extending downward and rearward from the respective disc blade and positioned alongside the disc blade and to act both as a blade scraper and as a soil firmer.

18 Claims, 3 Drawing Sheets

SEED DRILL WITH SCRAPER/SOIL FIRMING ATTACHMENT

BACKGROUND OF THE INVENTION

1. Field of the Invention

The present invention relates generally to a seed drill of the type used to plant seeds in agricultural operations. The term "seed drill" is intended herein to encompass various types of seed planters including traditional seed drills, row planters and other similar devices. More particularly, the invention relates to such a seed drill which incorporates a disc blade soil opener for creating seed trenches with a scraper/soil firming attachment. The scraper/soil firming attachment simultaneously controls the movement of soil, firms the soil on each side of the disc blade(s) and scrapes the outside of the disc blade(s).

2. Description of the Related Art

Modern farmers are faced with a variety of problems, including increased concern for soil erosion, crop residue management and rising production costs with stagnant crop prices. One way farmers are successfully addressing each of these concerns is with "low till" or "no till" farming operations. In a no till operation, succeeding crops are planted directly into the soil without disturbing the crop residue from prior crops. This practice reduces costs since soil preparation, such as plowing, discing and harrowing, etc., is eliminated. Furthermore, by leaving the prior crop residue in the field, soil erosion is minimized.

Several factors determine the effectiveness of no till operations, particularly including the problem of depositing new seeds such that they are at the proper soil depth and are surrounded by soil. Various seed drills have been devised to accomplish this task. One common type of no till seed drill uses a double disc soil opener in which a pair of disc blades are positioned on respective sides of a common axle. The disc blades converge toward each other in front of the axle, virtually meeting each other at a point where they contact the soil, and diverge away from each other behind the axle. The blade axes can be aligned or slightly staggered, with the converging forward portions of the blades opening a seed trench and with the diverging trailing blade portions spreading the trench. A seeder is disposed above the disc blades, dropping seeds and, optionally, fertilizer, within the space between the blades. Typically a trailing press wheel compacts the trench around the seeds to provide for good seed to soil contact. In another common seed drill type, a single disc blade is mounted on a shaft at a greater angle across the path of movement of the seed drill. Finally, some seed drills use fixed shank openers or "hoe drills" to open soil for seed deposition.

In no till farming, soil conditions are, almost by definition, less than ideal. The soil surface is generally somewhat irregular, and crop residue from prior crops acts as debris which can collect around deposited seeds, preventing good soil to seed contact. Regardless of the type of soil opener used on a seed drill, the debris often collects on the soil opener blades, clogging them or impeding their proper operation. Finally, as the soil opener forces soil outward to create the seed trench, soil "blow-out" can occur, i.e. the uncontrolled dirt flow from the outside of the disc blade(s) such that the soil cannot be redeposited in the trench by the trailing press wheel. The inventor has found that soil blow-out is a factor of soil conditions but also of the speed of movement of the seed drill, i.e. the faster the seed drill is pulled, the worse the soil blow-out.

Prior art attempts to control soil blow-out have included the addition of various types of leading coulters placed directly in front of each soil opener. In effect, this is an attempt to loosen the soil, thus limiting or eliminating the soil conditions which result in blow-out. These attempts, although they have somewhat lessened the condition, do not eliminate blow-out and the addition of coulter blades, axles, bearings, etc. add significantly to the complexity, cost, and maintenance of the seed drill.

Other inventors have added scrapers to soil openers to scrape debris off of the disc blade or blades as they rotate. Typically these scrapers are suspended from the seed drill frame such that they are positioned adjacent to and are stationary with respect to the rotating blade or blades, thus constantly scraping debris form the blades. However, these scrapers merely clear the debris off of the blades after it collects and do nothing to prevent the collection of debris on the blades, or, particularly around the disc blade axles and bearings. Furthermore, they do nothing to address the problem of soil blow-out.

Accordingly, it is clear that a need exists for an improved seed drill attachment for jointly addressing the problems of soil blow-out and soil opener blade scraping, particularly in no till or low till farming operations. Such an attachment should allow the seed drill to be reliably operated at higher speeds without unduly increasing the incidence of soil blow-out. Finally, the attachment should be economical to manufacture and install and should not add significantly to the cost and complexity or maintenance of the seed drill.

SUMMARY OF THE INVENTION

In the practice of the present invention, a seed drill includes a conventional single or double disc blade soil opener for creating seed trenches for the deposition of seeds by a seeder. A trailing press wheel acts both as a depth gauge for the soil opener and as a soil compactor for reclosing the soil trench behind the seeder. For either single or double disc blade soil openers, a scraper/soil firming assembly is attached to the outside of each disc blade. Each scraper/soil firming assembly includes a mounting bracket with a substantially vertical flat plate including a through bore extending therethrough for connection of the bracket to the axle of the respective disc blade. An arcuate slot also extends through the vertical flat plate near one end thereof. An angled shield extends inward from a second end of the vertical flat plate toward the disc blade from the flat plate. A substantially horizontal mounting plate extends at an approximately 90 degree inward from the bottom of the vertical flat plate toward the disc blade and includes a pair of through bores for mounting a scraper/soil firming blade. The scraper/soil firming blade is a flat bar attached beneath the horizontal mounting plate and extending downward and rearward from the respective disc blade. The scraper/soil firming blade is positioned alongside the disc blade and thus acts as a blade scraper. At the same time, the scraper/soil firming blade contacts the ground immediately adjacent to and just behind the disc blade. The scraper/soil firming blade is preferably made of ultra high molecular weight (UHMW) plastic which is extremely durable and abrasion resistant, but is also flexible. Thus, the scraper/soil firming blade also acts as a soil firmer, preventing soil blow-out from the outside of the corresponding disc blade and, in double disc openers, at least partially pushing the sides of the seed trench back over the deposited seeds ahead of the trailing press wheel.

A tear shaped locking plate is provided with a hex shaped bore near one end and with a round bore near the other end. The hex shaped bore mates with the head of a hex head bolt which acts as an axle for the disc blade and the round bore is then aligned with the slot in the mounting bracket. A locking bolt extends through the round bore and the slot with a nut and lock washer attached to the bolt on the inside of the mounting bracket. The locking plate is thus fixed in position with respect to the disc axle and the mounting bracket is adjustable in angle by movement back and forth along the slot. This adjusts the angle of the scraper/soil firming blade with respect to the ground.

OBJECTS AND ADVANTAGES OF THE PRESENT INVENTION

The objects and advantages of the present invention include: providing an improved seed drill; providing such a seed drill with a scraper/soil firming attachment; providing such a scraper/soil firming attachment with an assembly attached to one or more soil opening disc blade(s); providing such scraper/soil firming assemblies which both scrape the outside of the respective soil opening disc blade and firm the soil around the corresponding disc blade, thus preventing or limiting soil blow-out from the outside surface of the disc blade; providing such a scraper/soil firming assembly which includes a scraper/soil firming blade and a mounting bracket for attaching the scraper/soil firming blade to the disc blade axle; providing such a scraper/soil firming assembly in which the mounting bracket is adjustable to vary the angle of the scraper/soil firming blade with respect to the ground; providing such a scraper/soil firming assembly with a locking plate which locks the mounting bracket and the connected scraper/soil firming blade at a particular angle; providing such a scraper/soil firming blade which is extremely durable and abrasion resistant, yet flexible; providing such a scraper/soil firming assembly which is economical to manufacture and install and which does not add significantly to the maintenance requirements of the seed drill; and providing such a seed drill and scraper/soil firming assembly which is efficient and convenient in operation, capable of a long operating life and which is particularly well adapted for the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE PREFERRED EMBODIMENTS

I. Introduction and Environment

Figure 1:
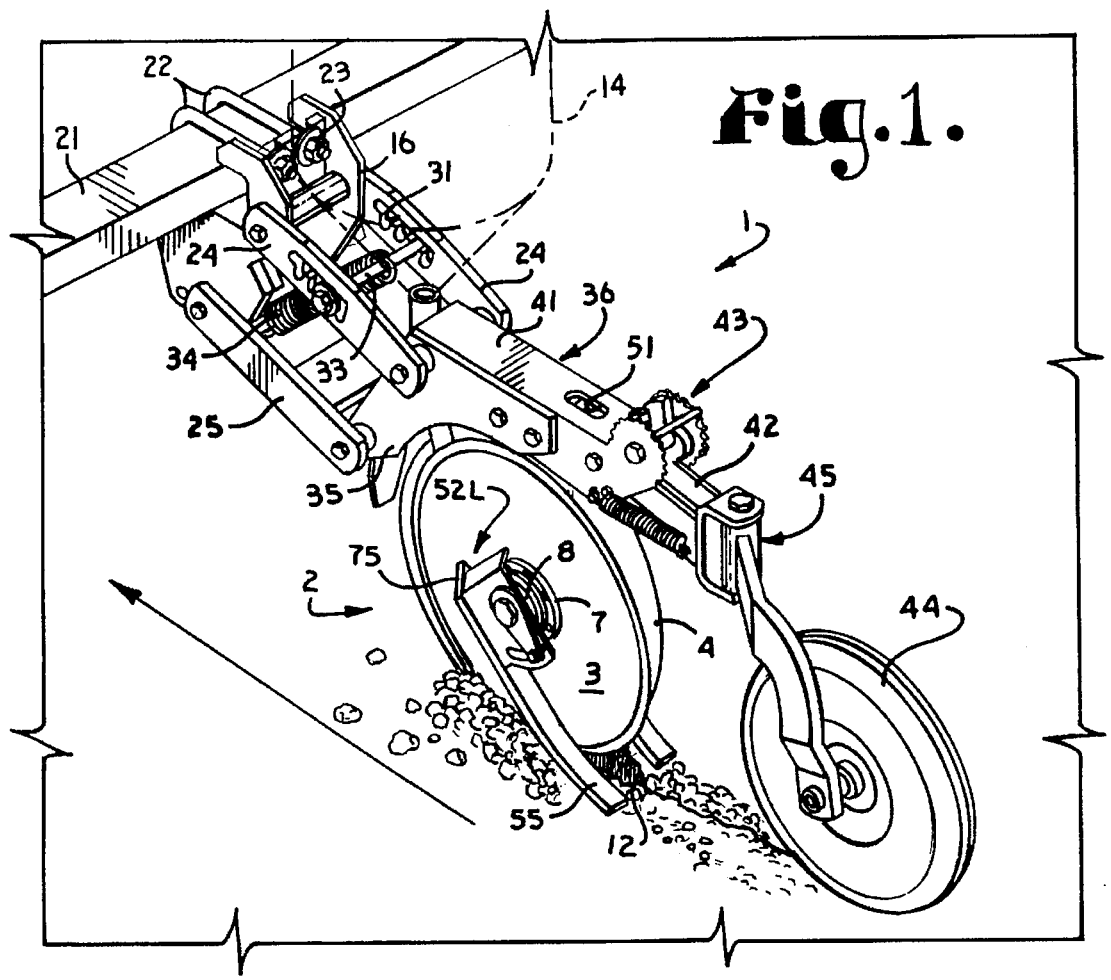
FIG. 1 is a perspective view of a seed drill with a double disc blade soil opener and with a pair of scraper/soil firming assemblies in accordance with the present invention attached to respective ones of the soil opening disc blades, and showing a seed dispenser in phantom lines and with the seed drill opening a seed trench and with the scraper/soil firming assemblies both scraping the disc blades and firming the soil outside of the disc blades.

As required, detailed embodiments of the present invention are disclosed herein; however, it is to be understood that the disclosed embodiments are merely exemplary of the invention, which may be embodied in various forms. Therefore, specific structural and functions details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience and reference only and will not be limiting. For example, the words "up", "down", "right" and "left" will refer to directions in the drawings to which reference is made. The words "in" and "out" will refer to directions toward and away from, respectively, the geometric center of the structure being referred to. Said terminology will include the words specifically mentioned derivatives thereof and words of similar import.

II. First Embodiment of Seed Drill

Figure 2:
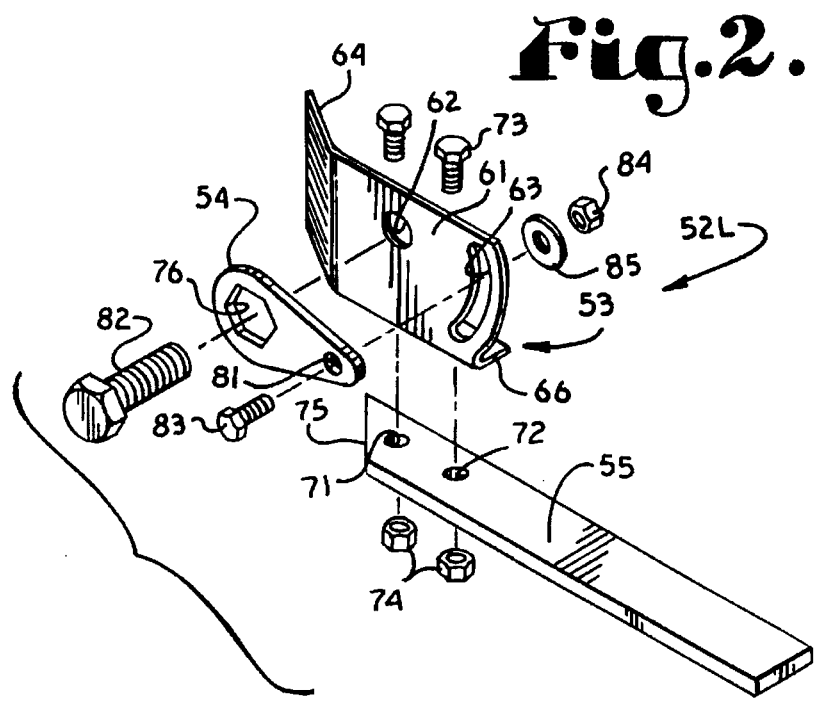
FIG. 2 is a greatly enlarged, exploded view of one of the scraper/soil firming assemblies of FIG. 1.
Figure 3:
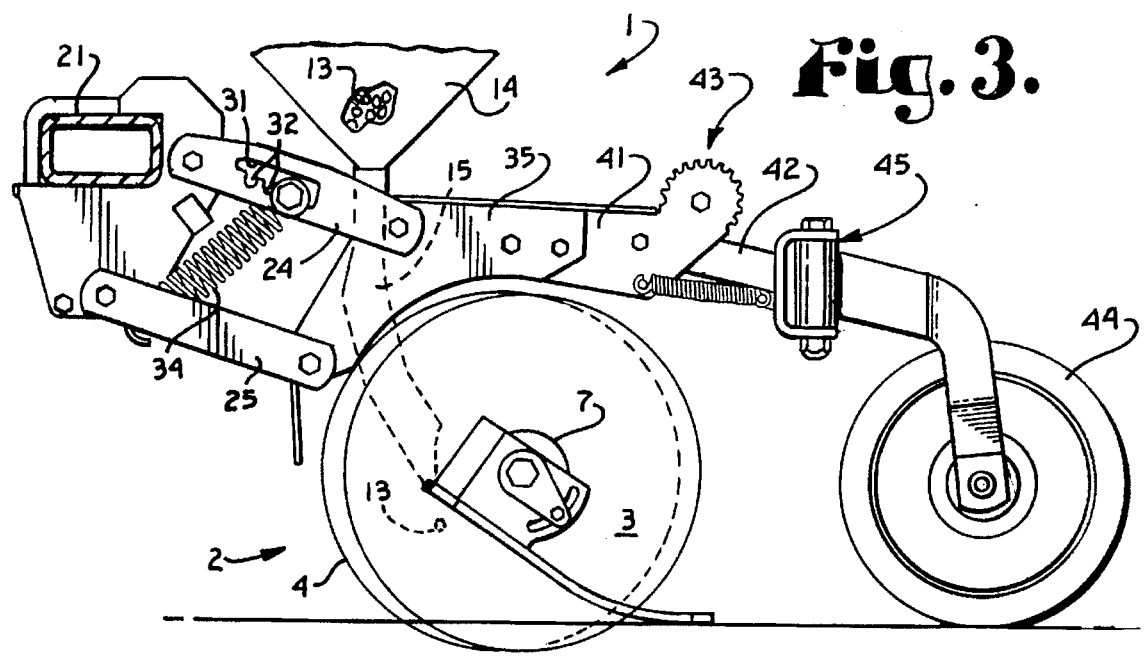
FIG. 3 is a side elevational view of the seed drill of FIG. 1, illustrating the press wheel depth adjustment and showing the flexibility of the scraper/soil firming blades.
Figure 4:
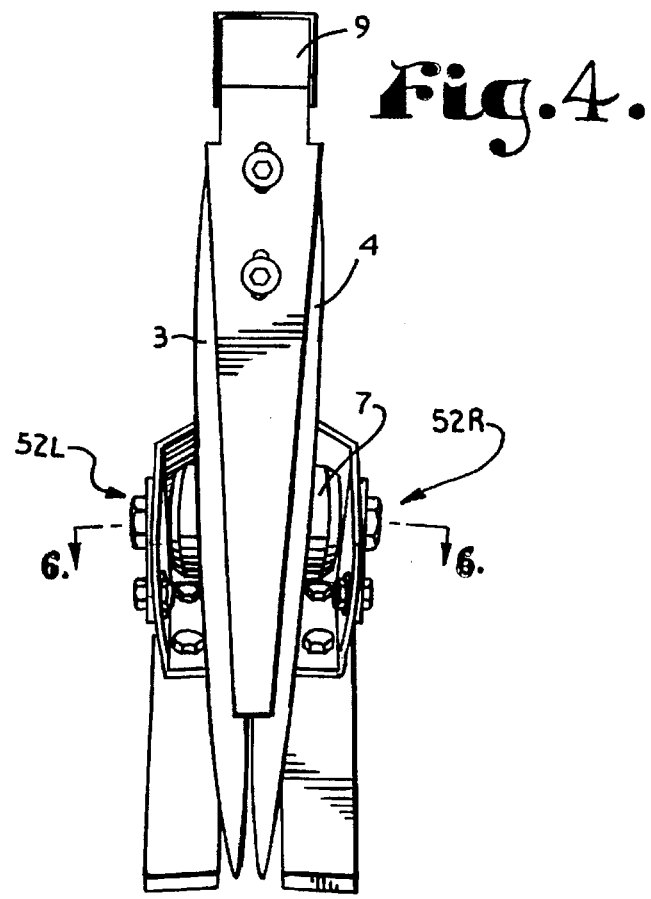
FIG. 4 is a greatly enlarged, fragmentary rear elevational view of the double disc blade soil opener equipped with scraper/soil firming assemblies.
Figure 6:
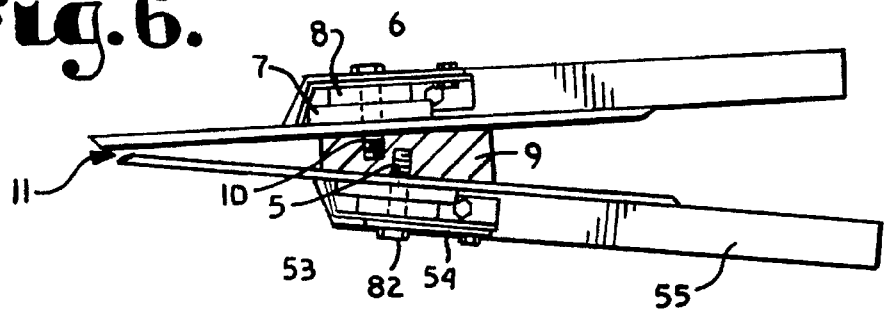
FIG. 6 is a greatly enlarged, fragmentary cross-sectional view of the double disc blade soil opener of the embodiment of FIGS. 1–4, taken along the line 6—6 of FIG. 4, with each disc blade equipped with a scraper/soil firming assembly.

Referring to the drawings in more detail, reference numeral 1 in FIGS. 1 and 2 generally designates a first embodiment of a seed drill. The seed drill 1 includes a double disc blade soil opener, generally indicated as 2. The soil opener 2 includes a left disc blade 3 and a right disc blade 4. Referring to FIGS. 1, 4 and 6, the disc blade 3 and the disc blade 4 are connected to respective axles 5 and 6 via a bearing plate 7 and a press fit bearing 8. An opener bar 9 includes a pair of angled threaded bores 10 for receiving the axles 5 and 6. The axles 5 and 6 are thus slightly offset and are angled with respect to each other such the disc blades 3 and 4 are slightly staggered and converge toward each other in a direction downward and forward of the axles 5 and 6. The front edges of the disc blades 3 and 4 meet or almost meet at a point 11 approximately 45 degrees forward and downward from the axles 5 and 6. Since the disc blades 3 and 4 are substantially flat, they correspondingly diverge from each other in a direction upward and rearward from the axles 5 and 6. The seed drill 1 is pulled in a direction represented by the arrow, thus causing the converging front edges of the disc blades 3 and 4 to open a seed trench 12 in the ground. The diverging angle of the disc blades toward the rear of the seed drill 1 open the trench 12 further. Seeds, such as the seeds 13 in FIG. 3, are periodically dropped from a seed hopper 14 into the open trench 12 via a conventional seed feeder (not shown) in a seed tube 15.

A bracket 16 is attached to an implement frame 21 via a pair of U bolts 22 and nuts 23. Two pairs of upper and lower mounting arms 24 and 25 are arrayed on respective sides of the bracket 16 and are pivotably attached at one end thereto.

Each upper mounting arm 24 includes a slot 31 with a series of detents 32 for receiving a rod 33. A pair of coil springs 34 are attached between the rod 33 and the bracket 16. The springs 34 urge the seed drill downward into contact with the soil and the detents 32 allow the downward pressure to be adjusted. The pairs of mounting arms 24 and 25 are pivotally attached to respective plates 35 and 36 which plates 35 and 36 are also attached to a substantially horizontal channel member 41. A second channel member 42 is attached to the rear of the channel member 41 via a ratchet mechanism 43. A press wheel 44 is pivotably attached to the second channel member 42 via a hinge 45. The angle of the press wheel 44 relative to the channel member 41 is adjustable via the ratchet mechanism 43. Thus, the press wheel 44 also serves as a depth gauge wheel for the soil opening disc blades 3 and 4 of the seed drill 1. The hinge 45 makes the press wheel 44 free pivoting with respect to the channel member 41 to limit stress on the press wheel 44 during turns. In addition to the seed tube 15, another opening 51 is provided through the channel member 41 for the optional introduction of wet or dry fertilizer or the like into the seed trench 12.

III. Scraper/Soil Firming Attachment

The scraper/soil firming attachment of FIGS. 1–4 and 6 includes a pair of scraper/soil firming assemblies are generally indicated as 52L and 52R. The scraper/soil firming assemblies 52L and 52R are essentially mirror images of each other, and, therefore, only the left assembly 52L is illustrated in detail in FIG. 2. The scraper/soil firming assembly 52L includes a mounting bracket 53, a tear drop shaped locking plate 54 and a scraper/soil firming blade 55. The mounting bracket 53 is formed of a steel plate with a substantially vertical flat plate portion 61 including a through bore 62 extending therethrough for connection of the bracket 53 to the axle 5 of the respective disc blade 3. An arcuate slot 63 also extends through the vertical flat plate portion 61 near a rear end thereof. An angled shield portion 64 extends inward from a front end of the vertical flat plate portion 61 toward the disc blade 3. The shield portion 64 acts to deflect dirt and crop debris away from the bearings 8 and the axle 5 of the disc blade 3. A substantially horizontal mounting plate portion 66 extends at an approximately 90 degree inward from the bottom of the vertical flat plate portion 61 toward the disc blade 3 and the mounting plate portion 66 includes a pair of through bores (not shown) for mating with a like pair of through bores 71 and 72 of the scraper/soil firming blade 55. The scraper/soil firming blade 55 is thus attached to the mounting bracket 53 via a pair of bolts 73 and corresponding nuts 74. The scraper/soil firming blade 55 is a flat, flexible bar which extends downward and rearward from the respective disc blade 3. The scraper/soil firming blade 55 is positioned alongside the disc blade 3 via the horizontal mounting plate portion 66 and thus acts as a disc blade scraper. The scraper/soil firming blade 55 and the horizontal mounting plate portion 66 also act to deflect dirt and debris away from the bearings 8 and the axle 5. At the same time, the scraper/soil firming blade 55 contacts the ground immediately adjacent to and just behind the disc blade 3. The scraper/soil firming blade 55 is preferably made of UHMW plastic which is extremely durable, abrasion resistant, but is also flexible. Thus, as illustrated in FIGS. 1 and 3, the scraper/soil firming blade 55 flexes when it is pulled forward with the seed drill 1, thus putting downward pressure on the sides of the seed trench 12, acting as a soil firmer, preventing soil blow-out, at least partially pushing the sides of the seed trench 12 back over the deposited seeds 13 ahead of the trailing press wheel 44 and aiding the flow of residue around the seed drill 1, thereby reducing clogging thereof. A leading edge 75 of the blade 55 can be beveled, which aids the shield portion 64 in deflecting dirt and debris away form the bearing 8 and the axle 5.

The tear drop shaped locking plate 54 is provided with a hex shaped bore 76 near one end and with a round bore 81 near the other end. The hex shaped bore 76 mates with the head of a hex head bolt 82 which forms the axle 5 of the disc blade 3. The hex bolt 82 thus holds the locking plate 54 in a fixed position as the disc blade 3 rotates. The locking plate 54 is thus positioned such that the round bore 81 is aligned with the arcuate slot 63 in the mounting bracket 53. A locking bolt 83 extends through the round bore 81 and then through the slot 63 with a nut 84 and washer 85 attached to the bolt 83 on the inside of the mounting bracket 53. The locking plate 54 is thus fixed in position with respect to the disc axle 5 and the mounting bracket 53, and the attached scraper/soil firming blade 55, is adjustable in angle by loosening the nut 84 and moving the mounting plate 53 back and forth along the slot 63. This adjusts the angle of the scraper/soil firming blade 55 with respect to the ground to thereby adjust the degree of soil firming done by the scraper/soil firming blade 55. For example, the angle of the blades 55 can be adjusted to compensate for varying soil conditions or for different running depths of the disc blades 3 and 4, as dictated by the angle of the press wheel 44. It should be noted that the hex axle bolt 82, since it is positioned on the left side of the seed drill 1, is preferably left threaded to prevent the rotary action of the left disc 3 from loosening it. Likewise, the axle 6 on the right disc blade 4 and the right scraper/soil firming assembly 52R is preferably right hand threaded for the same reason.

The scraper/soil firming assemblies 52R and 52L allow the seed drill 1 to be operated at considerably faster speeds without producing soil blow-out, thus greatly increasing the utility and efficiency of the seed drill 1.

In one embodiment of seed drill 1, the scraper/soil firming blades 55 were made of an elongate plate of UHMW plastic approximately ⅜" thick×1.5" wide and approximately 15" long.

III. Second Embodiment of Seed Drill

Figure 5:
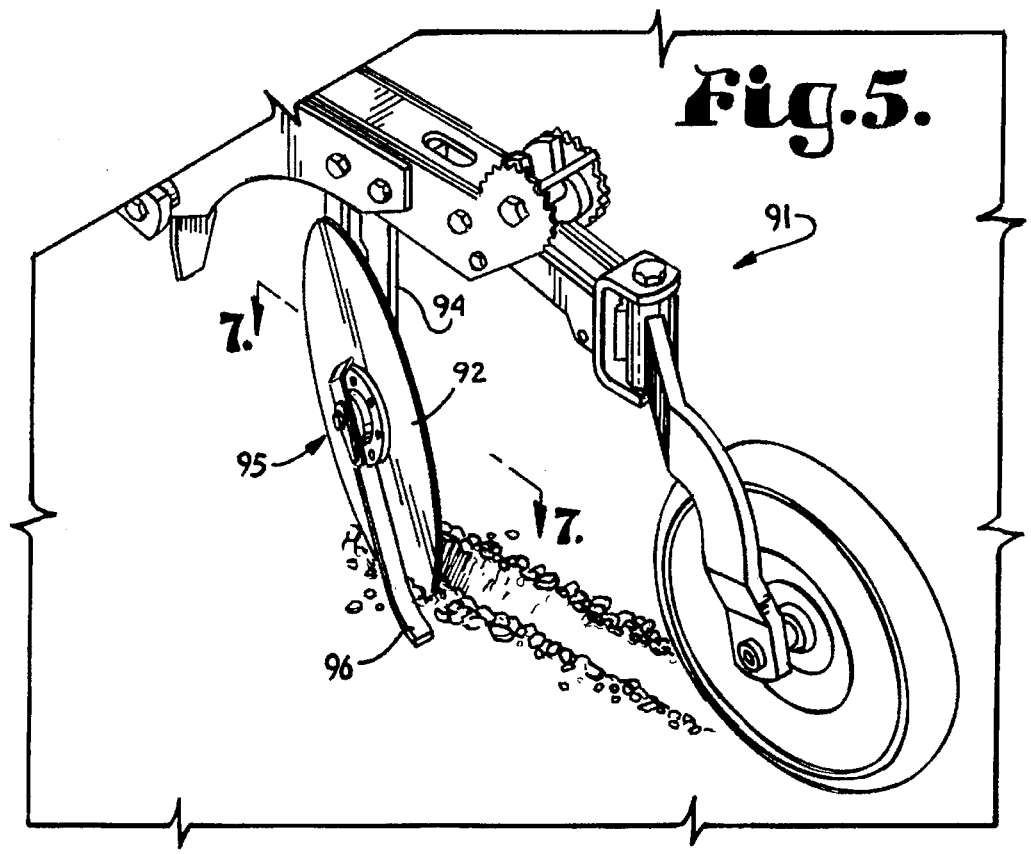
FIG. 5 is an enlarged, fragmentary perspective view of a second embodiment of seed drill with a single disc blade soil opener equipped with a single scraper/soil firming assembly.
Figure 7:
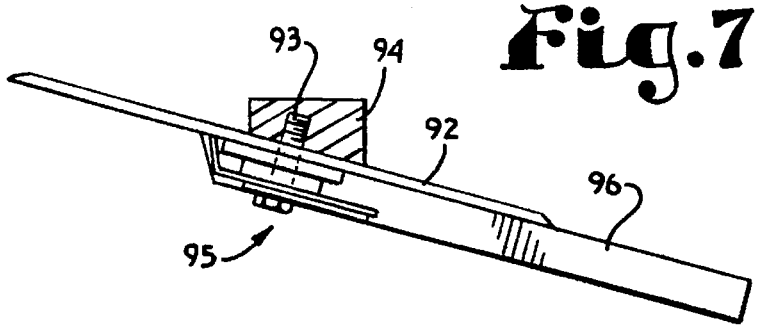
FIG. 7 is a greatly enlarged, fragmentary cross-sectional view of the single soil opening disc blade of the embodiment of FIG. 5, taken along line 7—7 of FIG. 5, with the disc blade equipped with a single scraper/soil firming assembly.

Referring to FIGS. 5 and 7, a second embodiment of seed drill is generally indicated at 91. The seed drill 91 is similar in most respects to the seed drill 1, differing only in the use of a single soil opening disc blade 92 instead of the double disc blades 3 and 4. The disc blade 92 is attached to an axle 93 threaded into an opener bar 94. The disc blade 92 is preferably somewhat larger in diameter than the disc blades 3 and 4, and is angled at an angle across the path of travel of the seed drill 91 of approximately twice that of each of the blades 3 and 4 across the path of travel of the seed drill 1. For example, the disc blades 3 and 4 might be angled at approximately 10 degrees across the path of travel of the seed drill 1 while the single disc blade 92 might be angled at approximately 20 degrees across the travel path of the seed drill 91.

A single scraper/soil firming assembly 95 and a scraper/soil firming blade 96 are similar in all respects to the left scraper/soil firming assembly 52L of FIGS. 1–4 and it therefore will not be further described in detail. The scraper/soil firming assembly 95 is attached to the disc blade axle 93 in the same manner as the assemblies 52L and 52R are attached to the axles 5 and 6, respectively. The scraper/soil firming assembly blade thus also simultaneously firms the soil along the disc blade 92 to prevent soil blow-out and scrapes the outside of the disc blade 92 as it rotates. The scraper/soil firming blade 95 can be somewhat longer, wider and thicker than the scraper/soil firming blades 55 attached to the double disc blades 3 and 4 of FIGS. 1–4.

It should be noted that, although the scraper/soil firming blades 55 and 95 have been described as being made of UHMW plastic, other materials, such as spring steel, can be used effectively as well, and the blades 55 can be shaped differently as well. Furthermore, the dimensions and angles described above are merely representative and other dimensions and angles can be used as well. While the preferred embodiment of the scraper/soil firming assemblies 52L, 52R and 92 have been illustrated and described as being attached to the axles 5, 6 and 93, respectively, it is envisioned that they can be attached to the frame supporting the soil opening discs instead, such as to the plates 35 and 36, for example. The seed drill 1, as illustrated, is representative of a seed drill manufactured by Sunflower Manufacturing Co., Inc. of Beloit, Kans. However, the inventive scraper/soil firming assemblies 52R, 52L and 92 can be used equally effectively with other types of seed drills and, as an add-on attachment to seed drills, row planters, etc. made by other manufacturers. The scraping/soil firming assemblies 52L, 52R, and 92 can be used equally effectively with flat disc openers or concave or convex disc openers.

It is thus to be understood that while certain forms of the present invention have been illustrated and described herein, it is not to be limited to the specific forms or arrangement of parts described and shown.

What is claimed and desired to be secured by Letters Patent is as follows:

1. A seed drill comprising:
   a. a soil opener including a first soil opening disc blade rotatably attached to a first axle, said first axle and said first disc blade being oriented such that said first disc blade is angled across a path of travel of said seed drill so that said first disc blade opens a seed trench along said path of travel;
   b. a first scraping/soil blow-out prevention assembly attached via said first axle of said soil opener, said first scraping/soil blow-out prevention assembly including a blade, said blade being sized and positioned such that it simultaneously:
      i. scrapes an outside surface of said first disc blade as it rotates; and
      ii. prevents soil blow-out alongside the outside of said first disc blade.

2. A seed drill comprising:
   a. a soil opener including a soil opening disc blade rotatably attached to an axle, said axle and said disc blade being oriented such that said disc blade is angled across a path of travel of said seed drill so that said disc blade opens a seed trench along said path of travel;
   b. a scraping/soil blow-out prevention assembly attached via said axle of said soil opener, said scraping/soil blow-out prevention assembly including:
      i. a blade;
      ii. a blade mounting bracket with first and second horizontal apertures therethrough, said first aperture accommodating said axle and said second aperture being an arcuate slot;
      iii. a locking plate with first and second bores therethrough, said first bore accommodating a head of said axle to fix said locking plate relative to said axle, said second bore being aligned with said arcuate slot in said mounting bracket; and
      iv. locking means extending through said second bore and said arcuate slot for locking said mounting bracket at a selected angle relative to said locking plate.

3. A seed drill as in claim 2, wherein said mounting bracket also includes a mounting surface for mounting said blade in a position alongside said disc blade.

4. A seed drill as in claim 2, wherein said blade comprises UHMW plastic.

5. A seed drill as in claim 1, and wherein:
   a. said soil opener includes a second soil opening disc blade rotatably attached to a second axle, said second axle and said second disc blade being oriented such that said second blade is angled across said path of travel of said seed drill in a direction opposite to said first disc blade such that front surfaces of said first and second disc blades converge toward each other, said first and second disc blade, together, opening said seed trench along said path of travel; and
   b. a second scraping/soil blow-out prevention assembly attached via said second axle of said soil opener, said second scraping/soil blow-out prevention assembly including a second blade, said second blade being sized and positioned such that it simultaneously:
      i. scrapes an outside surface of said second disc blade as it rotates; and
      ii. prevents soil blow-out alongside of said second disc blade.

6. A seed drill as in claim 5, wherein each of said first and second scraper/soil blow-out prevention assemblies further comprises:
   a. a blade mounting bracket with first and second horizontal apertures therethrough, said first aperture accommodating a respective axle and said second aperture being an arcuate slot;
   b. a locking plate with first and second bores therethrough, said first bore accommodating a head of said respective axle to fix said locking plate relative to said axle, said second bore being aligned with said arcuate slot in said mounting bracket; and
   c. locking means extending through said second bore and said arcuate slot for locking said mounting bracket at a selected angle relative to said locking plate.

7. A seed drill as in claim 6, wherein each said mounting bracket also includes a mounting surface for mounting the respective blade in a position alongside said respective disc blade.

8. A seed drill as in claim 6, wherein each said blade is a flat plate of UHMW plastic.

9. A scraper/soil blow-out prevention attachment for a seed drill, said seed drill including a soil opener including a first soil opening disc blade rotatably attached to a first axle, said first axle and said first disc blade being oriented such that said first disc blade is angled across a path of travel of said seed drill so that said first disc blade opens a seed trench along said path of travel, said scraper/soil blow-out prevention attachment comprising:
   a. a first scraping/soil blow-out prevention assembly attachable via the first axle of said soil opener, said first scraping/soil blow-out prevention assembly including a blade, said blade being sized and positioned such that, when said first scraping/soil blow-out prevention assembly is attached to said seed drill, said blade simultaneously:
      i. scrapes an outside surface of said first disc blade as it rotates; and ii. prevents soil blow-out alongside the outside of said first disc blade.

10. A scraper/soil blow-out prevention attachment as in claim 9, wherein said first scraper/soil blow-out prevention assembly further comprises:

a. a blade mounting bracket with first and second horizontal apertures therethrough, said first aperture accommodating said first axle and said second aperture being an arcuate slot;

b. a locking plate with first and second bores therethrough, said first bore accommodating a head of said first axle to fix said locking plate relative to said first axle, said second bore being aligned with said arcuate slot in said mounting bracket; and c. locking means extending through said second bore and said arcuate slot for locking said mounting bracket at a selected angle relative to said locking plate.

11. A scraper/soil blow-out prevention attachment as in claim 10, wherein said mounting bracket also includes a mounting surface for mounting said blade in a position alongside the outside of said first disc blade.

12. A scraper/soil blow-out prevention attachment as in claim 10, wherein said blade comprises UHMW plastic.

13. A scraper/soil blow-out prevention attachment as in claim 9, and wherein said soil opener includes a second soil opening disc blade rotatably attached to a second axle, said second axle and said second disc blade being oriented such that said second blade is angled across said path of travel of said seed drill in a direction opposite to said first disc blade such that front surfaces of said first and second disc blades converge toward each other, said first and second disc blade, together, opening said seed trench along said path of travel, said scraper/soil blow-out prevention attachment further comprising:

a. a second scraping/soil blow-out prevention assembly attached via said second axle of said soil opener, said second scraping/soil blow-out prevention assembly including a second blade, said second blade being sized and positioned such that it simultaneously:
      i. scrapes an outside surface of said second disc blade as it rotates; and
      ii. prevents soil blow-out alongside the outside of said second disc blade.

14. A scraper/soil blow-out prevention attachment as in claim 13, wherein each of said first and second scraper/soil blow-out prevention assemblies further comprises:

a. a blade mounting bracket with first and second horizontal apertures therethrough, said first aperture accommodating the respective axle and said second aperture being an arcuate slot;

b. a locking plate with first and second bores therethrough, said first bore accommodating a head of said respective axle to fix said locking plate relative to said axle, said second bore being aligned with said arcuate slot in said mounting bracket; and c. locking means extending through said second bore and said arcuate slot for locking said mounting bracket at a selected angle relative to said locking plate.

15. A scraper/soil blow-out prevention attachment as in claim 14, wherein each said mounting bracket also includes a mounting surface for mounting said blade in a position alongside the outside of said respective disc blade.

16. A scraper/soil blow-out prevention attachment as in claim 14, wherein each said blade comprises UHMW plastic.

17. A scraper/soil blow-out prevention attachment for a seed drill, said seed drill including a soil opener including a soil opening disc blade rotatably attached to an axle, said axle and said disc blade being oriented such that said disc blade is angled across a path of travel of said seed drill so that said disc blade opens a seed trench along said path of travel, said scraper/soil blow-out prevention attachment comprising:

a. a mounting bracket with first and second horizontal apertures therethrough, said first aperture accommodating said axle and said second aperture being an arcuate slot, said mounting plate including a mounting surface for mounting a blade in a position alongside said disc blade;

b. a locking plate accommodating a head of said axle to fix said locking plate relative to said axle and a bore which is aligned with said arcuate slot in said mounting bracket when said locking plate is placed over said head;

c. locking means extending through said bore and said arcuate slot for locking said mounting bracket at a selected angle relative to said locking plate;

d. said blade being sized, and positioned by said mounting bracket such that it simultaneously:
      i. scrapes an outside surface of said disc blade as it rotates; and
      ii. prevents soil blow-out alongside the outside of said disc blade.

18. A scraper/soil blow-out prevention attachment as in claim 17, wherein said blade comprises UHMW plastic.

* * * * *